2 Sheets—Sheet.1.
B. W. SUTHERLEN.
Machines for Chamfering and Crozing Staves.
No. 196,948. Patented Nov. 6, 1877.
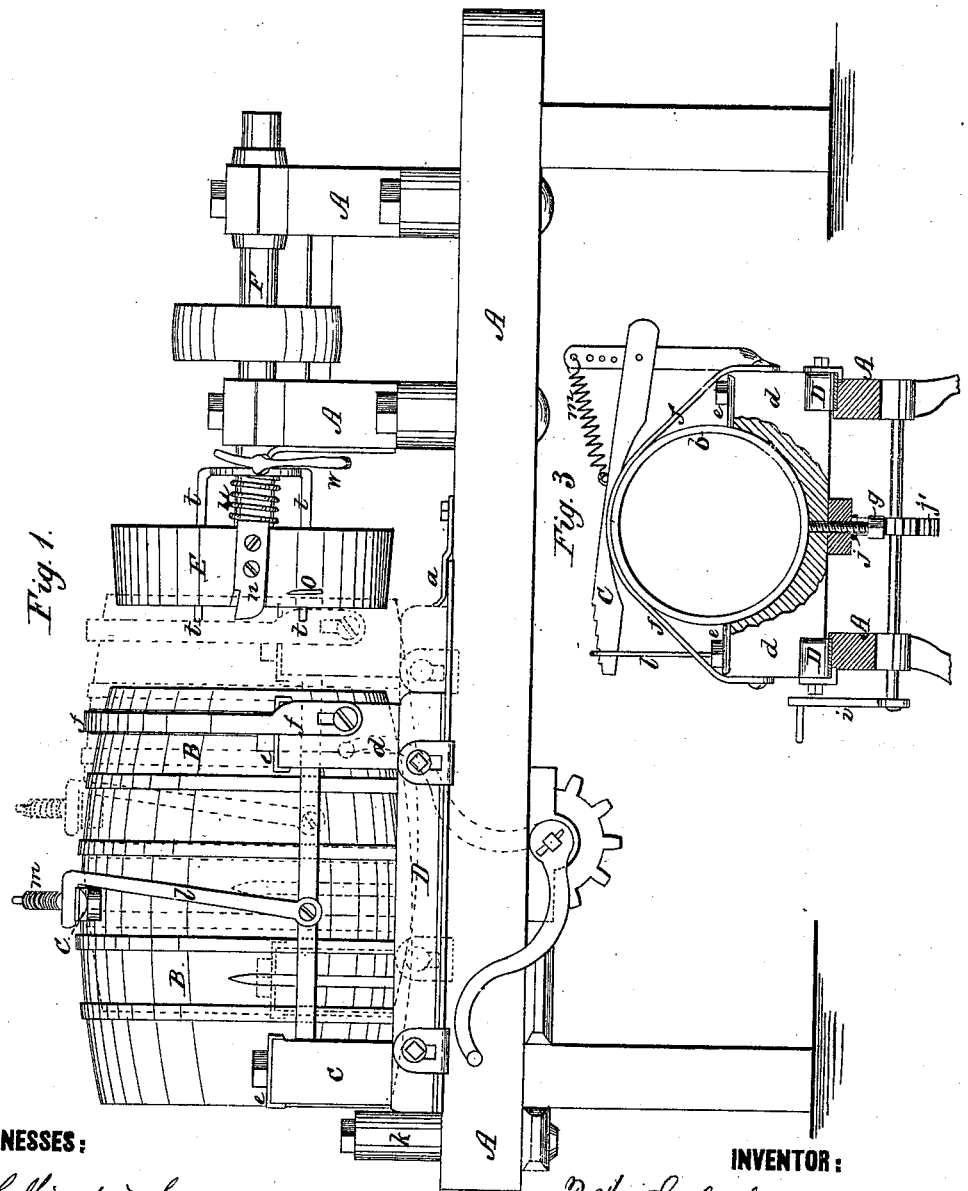
WITNESSES:
INVENTOR:
B. W. Sutherlen
BY
ATTORNEYS.
N. PETERS, PHOTO-LITHOGRAPHER, WASHINGTON, D. C.

2 Sheets—Sheet 2.
B. W. SUTHERLEN.
Machines for Chamfering and Crozing Staves.
No. 196,948. Patented Nov. 6, 1877.
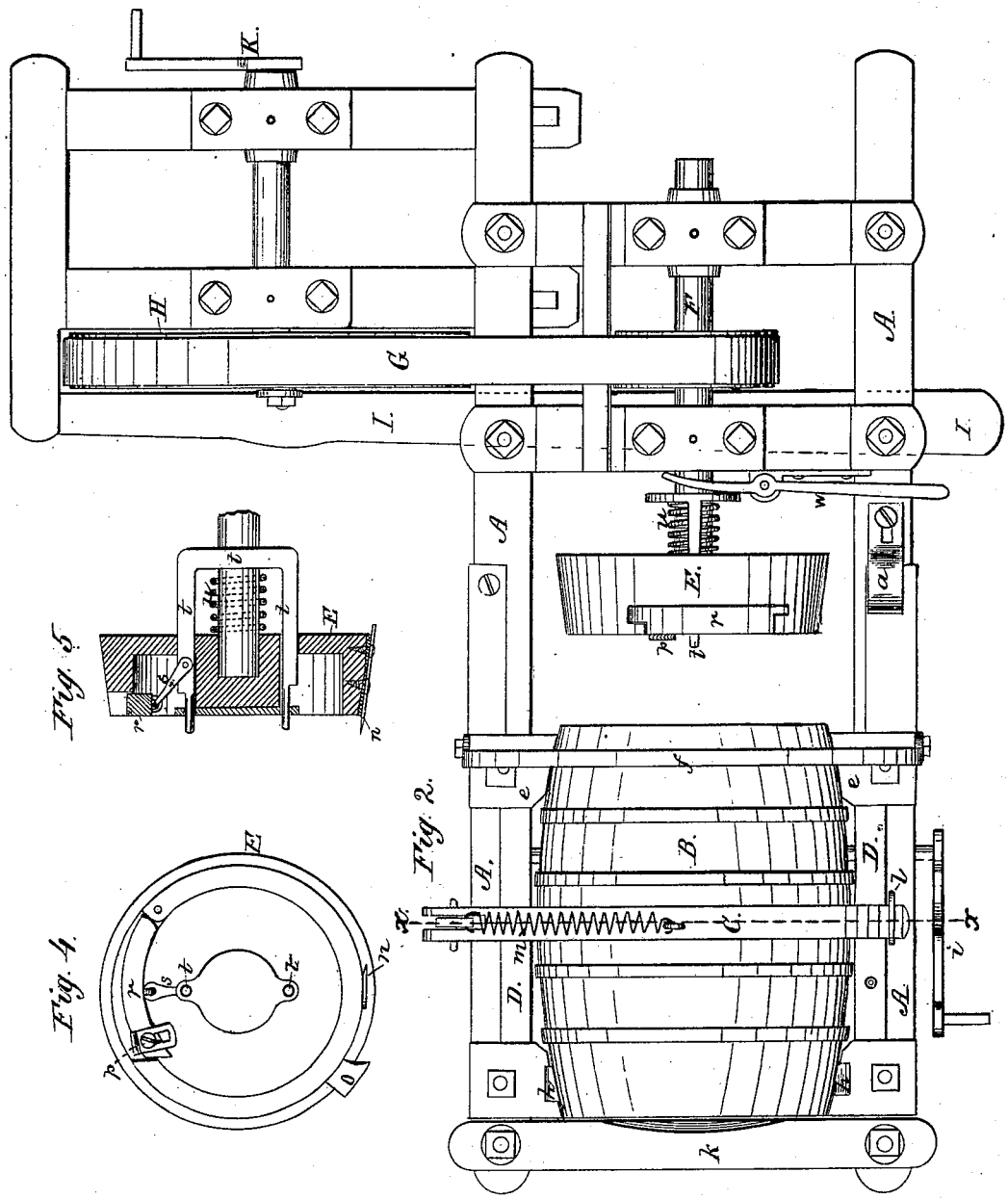
WITNESSES:
INVENTOR:
B. W. Sutherlen
BY
ATTORNEYS.

UNITED STATES PATENT OFFICE.

BENJAMIN W. SUTHERLEN, OF WYKOFF, ASSIGNOR OF ONE-HALF HIS RIGHT TO WILLIAM S. NACE, OF FILLMORE, MINNESOTA.

IMPROVEMENT IN MACHINES FOR CHAMFERING AND CROZING STAVES.

Specification forming part of Letters Patent No. 196,948, dated November 6, 1877; application filed August 14, 1877.

*To all whom it may concern:*

Be it known that I, BENJAMIN W. SUTHERLEN, of Wykoff, in the county of Fillmore and State of Minnesota, have invented a new and Improved Barrel Chamfering and Crozing Machine; and I do hereby declare that the following is a full, clear, and exact description of the same.

The object of my invention is to produce an improved simple, but effective, machine for chamfering, leveling, and crozing the ends of barrels or other casks.

The invention relates to means for adjusting the chuck that holds the end of a barrel, for the purpose of centering it with reference to the cutter-head, for clamping the barrel upon the sliding carriage, for forcing the barrel, and crozing the barrel, as hereinafter described.

In the accompanying drawing, forming part of this specification, Figure 1 is a side elevation of the machine, the dotted lines showing the position of the barrel and sliding carriage when the cutter-head is operating upon it. Fig. 2 is a plan view. Fig. 3 is a cross-section on line $x\ x$ of Fig. 2. Figs. 4 and 5 are, respectively, a face view and vertical cross-section of the cutter-head.

The working parts of the machine are fixed or otherwise mounted upon a suitable frame, A. The barrel B, whose ends are to be leveled, chamfered, and crozed, is clamped by a lever, C, in a sliding carriage, D, operated by a rack-pinion and crank-shaft.

The cutter-head E, carrying the cutting-tools, is fixed on the end of a shaft or spindle, F, which may be rotated by any suitable motor; but in this instance is operated by a belt, G, passing over a drive-wheel, H, provided with a treadle, I, and crank K.

I will first more particularly describe the construction of the carriage and its attachments, and next the cutter-head and its attachments.

The carriage D slides on the frame A to and from the cutter-head E, its movement in the direction of the latter being limited by a slotted adjustable stop, $a$. The end of the barrel to be chamfered, &c., is inserted in the annular chuck or beveled ring $b$, while its rear end rests in the semicircular bed or tail-block $c$. The said chuck $b$ is set in a groove in the semicircular head-block $d$, and held rigidly in place by means of notched plates $e$ and a strap, $f$. The plates $e$ are secured adjustably to the flat ends of the head-block by means of screw-bolts, and the strap which passes over the chuck $b$ is also secured adjustably to the end of the head-block by a screw passing through a slot, as shown in Fig. 1. A set-screw, $g$, works through the head-block from beneath, and, by forcing up the chuck or hoop $b$, clamps it against the strap $f$, and thereby secures it firmly in place.

The object of the vertical adjustment of the hoop or chuck is to enable barrels whose staves are of different thicknesses to be centered with reference to the cutter-head, so that the chines may be cut of the same thickness all round the barrel ends.

The semicircular bar $h$, upon which the rear end of the barrel rests while being chamfered, &c., is fitted in a groove in the tail-block $c$.

When a barrel is placed in the frame or carriage D, the latter is run back by the crank $i$, and rack $j$, and pinion $j'$, until its rear end strikes the top bar $k$, which is secured transversely to the frame A. The shock of such contact forces the barrel into the chuck, so that, when the lever C is brought down and secured by the pivoted open hook $l$, the barrel is immovably clamped to the carriage, and is ready to be operated upon by the cutter-head E.

The free end of the clamping-lever C is notched and beveled, to enable the claw or arm of hook $l$ to be moved upward thereon, for tightening the clamp. Yet this construction and function do not prevent the hook being readily disengaged from the lever by a lateral movement, as required when the chamfering and crozing operation has been finished.

When disengaged from the hook the lever C is held up out of the way by means of the spiral spring $m$, attached to the upper end of the standard to which the lever is pivoted.

The circular hollow rotating cutter-head E is beveled on its periphery and provided with three cutters—to wit, the chamfering-tool $n$, the leveling or squaring tool o, and the crozing-tool p—which operate in the order here named.

The chamfering tool or cutter n is so attached to the periphery of the cutter-head, by means of screw-bolts, that its cutting-end may be adjusted in or out for the purpose of adapting it to cut a thick or thin chine, according to the kind of barrel being operated upon. For example, a barrel for holding liquids requires a thick chine, while a flour-barrel may have a thin or flat chine. The angle of the cutter or tool n to the periphery of the cutter-head may be changed by chocking—that is, by inserting wedge-blocks under its inner or outer end, as will be readily understood.

The tool o for leveling the end of the barrel projects radially from the periphery of the cutter-head.

The crozing-tool p is attached to a pivoted section, r, of the periphery of the cutter-head, and may hence be adjusted in or out to bring it into action at the proper time—that is to say, after the chamfering and leveling tools have done their work.

The means I employ for adjusting the section r, to which the crozing-tool is attached, consist of a device operating somewhat like a toggle-lever, the parts of which are a link, s, a U-shaped bar, t, passing through the cutter-head and working in guides, a spiral spring, u, coiled around the shaft, and serving to draw the section r inward by pressure against the head of bar t, and a forked lever, w, whose function is to force the bar t inward against the stress of the spring u, and thereby cause the link s to force the crozing-tool out against the inner periphery of the barrel.

From the foregoing description it will be apparent that the operation subsequent to clamping the barrel in the carriage is as follows: The cutters being set in rapid motion, the crank i is rotated to advance the carriage and bring the inner end of the barrel into contact with the chamfering-tool n, by which a chine of the required angle and thickness is quickly cut. The continued but slow advance of the barrel next brings the cutter o into action, by which the end of the barrel is leveled or squared off. The operator then seizes the lever w and forces out the section r, with its attached crozing-tool p, which latter cuts a croze (of a depth corresponding to the pressure applied to said lever) immediately contiguous to the chamfered edge. The lever w is then released, the carriage D moved back, the clamping-lever C released, and the barrel reversed or removed.

By my improved machine the operation of chamfering, leveling, and crozing may be quickly and perfectly performed with the expenditure of but a small amount of labor.

What I claim is—

1. The combination of the vertically-adjustable chuck or hoop attached to the carriage and the cutter-head mounted on a spindle rotating in fixed bearings, as shown and described.

2. The combination of the annular chuck, the binding-strap, and notched plates, and the set-screw for securing said chuck, substantially as shown and described.

3. In a barrel-making machine, the combination, with the sliding carriage, of the clamping-lever, the retracting-spring, the standard extended above the fulcrum of the lever, and the hook having a horizontal arm or claw, and pivoted to the side of the carriage, the free end of the lever being beveled and provided with a series of steps or shoulders, all as shown and described, to operate as and for the purpose specified.

4. In a barrel-making machine, the cutter-head having a detachable section of its beveled periphery pivoted in the plane of said periphery, and provided with a cutter at its free end, the section being adjusted by suitable means, thus forming a crozing attachment, substantially as shown and described.

5. In a barrel-making machine, the combination, with the crozing device, consisting of an arm pivoted to the periphery of the cutter-head, of the sliding U-shaped bar, the link, the spiral spring coiled around the shaft contiguous to the cutter-head, and the lever for adjusting the crozing-tool, all as shown and described.

BENJAMIN WASHINGTON SUTHERLEN.

Witnesses:
H. ROBBINS,
T. M. MOSHER.